Sept. 12, 1933.  J. D. WILLIAMS  1,926,416
SWITCHBOARD CORD AND METHOD OF PREPARING THE SAME
Filed March 11, 1929
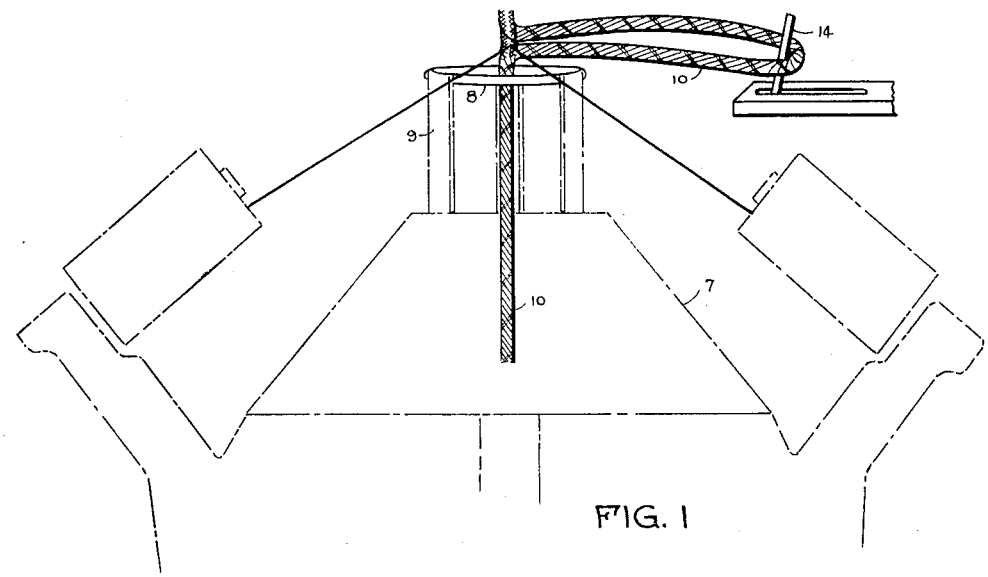
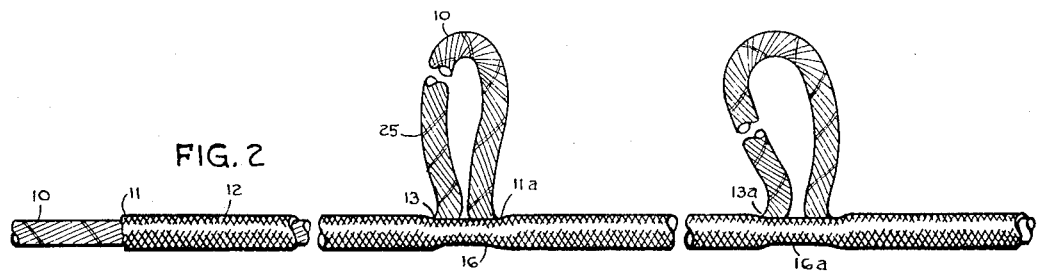
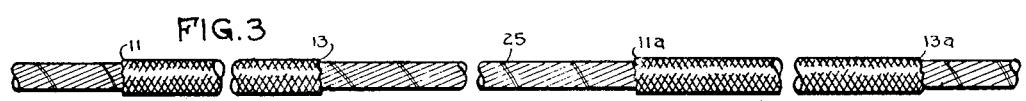
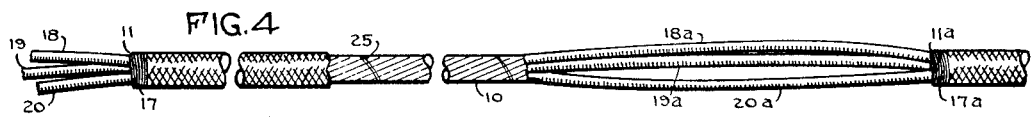
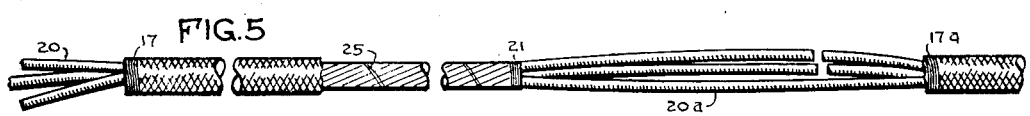
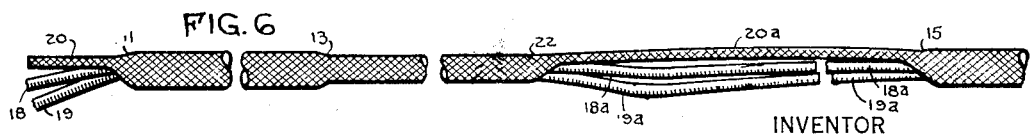
INVENTOR
JOHN DALE WILLIAMS
BY
ATTORNEY Patented Sept. 12, 1933

1,926,416

UNITED STATES PATENT OFFICE 1,926,416

SWITCHBOARD CORD AND METHOD OF PREPARING THE SAME

John Dale Williams, Rochester, N. Y., assignor to The Stromberg-Carlson Telephone Manufacturing Company, Rochester, N. Y., a corporation of New York Application March 11, 1929. Serial No. 346,104

6 Claims. (Cl. 173—264)

The invention relates to switchboard cords and the method for making them.

In the previous methods employed in manufacturing switchboard cords having a reenforced braid, it has been customary to cut into cord lengths the cordage consisting of the switchboard cord conductors formed after the manner of a rope-lay. After this cordage has been cut into proper cord lengths it has been the practice to apply a reenforcing layer of braid on the plug end of the cord which layer is continuous with the braid then applied to the entire length of the cord. According to the usual practice this reenforcing braid has been applied by inserting the unbraided cord into the cone of threads of a braiding machine at the point where it was desired to start the reenforcing layer of braid, after which the cord was elevated while the braiding machine was operated until the layer of braid was applied from the starting point to the plug end of the cord. Thereafter the braiding machine was stopped, the switchboard cord reversed end to end, and the braid then applied from the plug end of the cord to the other end thereof. Since it has been the procedure to stop the braider several times in the course of braiding each cord and to reverse it end to end in the process of applying the braided layer, it has been necessary to employ a type of braider known as the New England butt braider which is slow in applying braid and extremely noisy in operation. It has long been the hope of switchboard cord manufacturers that a method of manufacturing reenforced switchboard cords could be devised so that a fast, quiet operating braider might be used. The structure of these fast operating braiders has been such that the present method of braiding reenforced cords could not be performed on them.

It has also been desired that the reenforced braid could be applied to a continuous reel full of cordage after which the braided cordage could be cut into final length.

In accordance with the present invention a switchboard cord has been designed and a method of manufacturing it developed which achieves the mentioned, highly desirable results.

One of the features of the present invention includes a step in the method of braiding switchboard cords in which sections of a reenforcing layer of braid are applied at spaced intervals along the length of continuous cordage.

Another feature of the invention consists in applying an outer layer of braid over the spaced reenforcing layers of braid, and at spaced intervals along the length of the cordage the continuous outer layer of braid is applied to one only of the conductors of which the cordage is formed.

These and other features will appear from the detailed description and the claims at the end of the specification.

For a clearer understanding of the invention reference is made to Fig. 1 which is a schematic showing of a Wardwell braider in which a part of the "head" has been modified by substituting an enlarged supporting ring; Figs. 2, 3, 4, 5 and 6 represent successive stages in the new method of manufacturing reenforced switchboard cords.

In the manufacturing of switchboard cords according to the present invention, the several conductors of which the cord is formed, are twisted into a rope-lay with filler twine placed in the interstices of the conductors in accordance with the usual practice, as represented at 10 in Fig. 2. The cordage in this form is wound on a large reel so that it is easily transported from place to place. From this point in the manufacture, the present method differs from that now in use. The reel of cordage such as 10 is mounted adjacent to a braider similar to that represented in Fig. 1 which may be of the Wardwell type when modified by having the portion above the truncated cone 7, usually including a hollow cone, replaced by a ring 8 supported on uprights 9 so that a substantial portion of the cordage is visible between the ring and the truncated cone. The end of the cordage is pulled through the truncated cone 7 and the ring 8 after which the braider is put into operation and the reenforced section of braid 12 is applied, extending from point 11 to point 13. The length of this reenforcing layer, that is, the distance between points 11 and 13 depends on the manufacturing specifications of the cord. When the reenforcing layer has been applied to point 13, the braider is stopped, the cordage 10 is pulled through the cone of the threads and extended around an adjustable pin 14 thus forming a loop of a length corresponding to the portion of the finished switchboard cord that does not have reenforcing braid applied thereto. This portion of the cord is shown as that part extending between the points 13 and 15 in Fig. 6. With the loop of cordage thus drawn outside of the cone of threads, the braider is again started to apply a reenforcing section of braid from the point 11a to 13a on another portion of the cordage. It will be noted that the layer of braid at point 16 does not include the cordage. When point 13a is reached, another loop of cordage is pulled through the cone of threads to the marker 14 and the braider again started to apply the continuous layer of braid to another section of the cordage. It will be understood that this procedure is continued until the entire length of the cordage on the reel has braided portions and uncovered loops presenting the appearance of the portion thereof shown in Fig. 2.

After the braided layer has been applied in the manner just described, the braid is cut at the points 16 and 16a, after which the cordage will have the appearance of the portion thereof shown in Fig. 3, that is, with sections from points 11 to 13 and 11a to 13a having the reenforcing layer of braid applied thereto and with other portions of the cordage to which no braid has been applied. The filler twine 25 is removed from portions of the cordage adjacent points 11 and 11a to expose a section of the insulated conductors 18, 19 and 20 and also 18a, 19a and 20a represented in Fig. 4. The loose ends of the filler twine are used to wrap the cordage at points 17, 17a and at point 21 (Fig. 5). The binding of threads at 17 and 17a is made so that the plug end of the cord will be firm to permit a firm portion onto which the plug is assembled. After these steps, conductors 18, and 19, 18a and 19a are cut leaving conductors 20 and 20a uncut. The cordage in this condition then has a continuous outer braided layer applied by passing it again through a braider. In this manner, the braid is applied only to the conductor 20, the free ends of conductors 18 and 19 as shown in Figs. 5 and 6 being held outside of the cone of threads. From the point 11 to the point 22 the outer layer of braid is applied over all of the cordage but when the braid has been applied to the point 22 (Fig. 6), the free ends of conductors 18a and 19a are pulled outside of the cone of threads and the layer of braid is only applied over the conductor 20a. When, however, the layer of braid has been applied to the point 15, it then incloses all of the conductors for a succeeding portion of the cordage corresponding to the distance between points 11 and 22.

These steps are continued until the whole length of cordage is covered with an outer layer of braid. After this outer layer of braid has been thus applied to the cordage and to conductors 20 and 20a, these conductors are cut to the approximate length of their related conductors 18, 19 and 18a and 19a. The remaining operations of finishing the switchboard cords may be the same as those now employed.

While the several steps of braiding the reenforcing layer and the outer layer on the cordage may be performed on the same braider, the present method includes the use of one braider to apply the braid as shown in Fig. 2 after which the braid may be passed over a workbench where one or more operators perform the successive manual operations shown in Figs. 3, 4 and 5 after which the cordage may be passed through a second braider to apply the outer layer of braid as shown in Fig. 6. In this way the manufacturing of cords may be made a continuous process.

From the foregoing it will be seen that a switchboard cord is formed having a reenforced layer of braid from points 11 to 13 and having an outer layer of braid extending from point 11 to point 22. Although the outer layer of braid is not continuous with the inner reenforcing layer, it cannot be pulled back from the end of the cordage owing to the fact that the conductors 18 and 19 extend through this outer layer of braid while it covers conductor 20.

What I claim is:

1. A stage in the manufacture of multi-conductor reenforced switchboard cords which comprises applying a reenforcing layer of braid at spaced intervals along a continuous length of cordage, cutting all of the conductors of said cordage but one at spaced intervals, applying a continuous layer of braid over the entire length of said cordage including the uncut conductor.

2. A stage in the manufacture of reenforced switchboard cords which comprises applying a continuous layer of braid to a continuous length of cordage while spaced loops of said cordage are intermittently formed outside of said layer, cutting the layer of braid at points outside of said loops to remove the loops from the cordage, applying a continuous layer of braid covering said first mentioned layers and the remainder of the cordage, and cutting the cordage thus covered with braid into switchboard cords.

3. A stage in the manufacture of reenforced switchboard cords from cordage formed of conductors and filler twine arranged after the manner of a rope-lay which comprises applying a layer of braid to a section of the cordage, withdrawing a loop of cordage of predetermined length outside of said layer of braid, then applying a layer of braid to a section of cordage, again withdrawing the cordage outside of said layer of braid, cutting the layer of braid at each of the points where it is outside of the cordage, removing spaced sections of the filler twine adjacent one end of each of said layers of braid, cutting all of the conductors but one at points where the filler twine has been removed, applying an outer layer of braid over the entire length of the cordage including the reenforcing layers and the uncut conductor while retaining the ends of the cut conductors outside of said outer layer, and cutting the uncut conductor to a length corresponding to its related conductors.

4. A multi-conductor reenforced switchboard cord having a reenforcing layer of braid extending from an intermediate point to substantially one end thereof, and an outer layer of braid extending from one end of said cord covering said reenforcing layer and one of the conductors of said cord.

5. A reenforced switchboard cord comprising cordage formed of at least three conductors arranged after the manner of a rope-lay, a reenforcing layer of braid extending from an intermediate point on the cordage to within a short distance of one end thereof, and an outer layer of braid extending from the other end of said cord covering said reenforcing layer and the end of one of the conductors of said cord, the ends of the remaining conductors projecting through said outer layer of braid.

6. A reenforced switchboard cord comprising at least three conductors bound into cordage arranged after the manner of a rope-lay, the conductors at each of the ends of said cordage being separated, a reenforcing layer of braid extending from an intermediate point on said cordage to one end thereof, and an outer layer of braid covering both ends of one conductor and said cordage, both ends of each of the other conductors projecting through said outer layer of braid.

JOHN DALE WILLIAMS.